United States Patent
Thrap (12) United States Patent
(75) Inventor: Guy C. Thrap, Del Mar, CA (US)
(73) Assignee: Maxwell Technologies, Inc., San Diego, CA (US)
( * ) Notice: Subject to any disclaimer, the term of this patent is extended or adjusted under 35 U.S.C. 154(b) by 0 days.
(21) Appl. No.: 10/405,781
(22) Filed: Apr. 1, 2003
(65) Prior Publication Data
US 2004/0196669 A1 Oct. 7, 2004
(51) Int. Cl.[7] ............................................. H02M 3/335
(52) U.S. Cl. ...................................... 363/21.01; 363/97
(58) Field of Search .............................. 363/18, 19, 20, 363/21.01, 95, 97, 131

(56) References Cited

U.S. PATENT DOCUMENTS

| 4,104,714 | A |   | 8/1978  | Smith et al. |         |
|-----------|---|---|---------|--------------|---------|
| 4,146,832 | A | * | 3/1979  | McConnell    | 323/285 |
| 4,272,806 | A |   | 6/1981  | Metzger      |         |
| 5,060,131 | A | * | 10/1991 | Sikora       | 363/97  |
| 5,862,045 | A | * | 1/1999  | Halamik et al. | 363/97 |
| 6,081,104 | A | * | 6/2000  | Kern         | 323/268 |

* cited by examiner

Primary Examiner—Adolf Berhane
(74) Attorney, Agent, or Firm—Gregory J. Koerner; Redwood Patent Law

(10) Patent No.: US 6,912,136 B2
(45) Date of Patent: Jun. 28, 2005

(54) SWITCHING POWER SUPPLY (57) ABSTRACT

Self-oscillating, current controlled switching power supplies, used for example, as energy storage device charging circuits, and related methods are provided herein. In one implementation, a switching power supply comprises a power transformer having a primary and a secondary, a switching element that switches a voltage source to the primary, and a control circuit that controls the operation of the switching element in response to the measured primary current and secondary current. The switching element disconnects the voltage source from the primary when the primary current reaches a first threshold, causing the secondary current to conduct. The switching element switches back to the primary when the secondary current drops to second threshold. The switching power supply oscillates between charging and discharging the power transformer. In one embodiment, a high value energy storage capacitor is coupled to the secondary and is charged with the secondary current.

23 Claims, 5 Drawing Sheets

SWITCHING POWER SUPPLY

BACKGROUND OF THE INVENTION

1. Field of the Invention

The present invention relates generally to power supplies, and more specifically to power supplies for charging capacitors.

2. Discussion of the Related Art

Capacitors are energy storage devices that are capable of storing energy, which may be very rapidly discharged and then subsequently recharged. Conventional capacitor charging circuits typically utilize a DC source, such as a battery, which is used to charge the capacitor. Typically, current is allowed to flow into a primary winding of the transformer to store energy, which is then discharged into the capacitor in the form of a charging current flowing through the secondary winding of the transformer into the capacitor to be charged. Such charging circuits oscillate between storing energy into the transformer (a charging cycle of the transformer) and then transferring this energy into the capacitor (a discharging cycle of the transformer) until it is charged to the desired level.

However, a completely discharged capacitor appears as a dead short, e.g., 0 volts at the output, which causes excessive current surges that may damage the charging circuit. These current inrushes occur for a relatively long time since as the voltage at the output is near zero, the transformer takes considerable time to discharge. Furthermore, the time period of the charging and discharging cycles are set. Thus, if the transformer is not allowed to sufficiently discharge, additional energy transferred into the transformer in successive charging cycles may saturate the transformer. In order to allow the transformer to sufficiently discharge during the initial current surges, a current limit path, e.g., a choke inductor or a resistor, is used to provide a path for the current such that the secondary of the transformer can be adequately discharged before the next charging cycle begins. Disadvantageously, the majority of the initial energy is not transferred to the capacitor. Once the voltage level of the capacitor reaches a point where it is safe for the entire discharging current to flow into the capacitor without saturating or damaging the charging circuit, the current limit path is removed.

The switching of the charging and discharging cycles can be variously controlled. For example, in many DC—DC converters in which a battery source is used to charge a capacitor, the switching is set at a fixed frequency. That is, after a predetermined time period, the charging cycle is switched to the discharging cycle, and then the switched back to the charging cycle.

In another example, such as described in U.S. Pat. No. 4,104,714, issued Aug. 1, 1978, a battery of a DC—DC Converter is coupled to a transformer to charge the capacitor for use in a gas ignition system or photographic flash, for example. The circuit is designed to regulate the battery current in order to obtain maximum power transfer from the battery through its useful life. The charging cycle is terminated or switched when the current flowing in the primary of the transformer reaches a predetermined level. The discharging cycle is terminated or switched based on when the current in the secondary drops to a zero level threshold (all of the energy has discharged) and when the battery voltage rises back to a threshold. Thus, there is a delay between the discharge cycle and the start of the charging cycle to allow the battery to return to a given voltage level so that it can maintain maximum power transfer from the battery. Therefore, the restarting of the charging cycle is dictated by the battery voltage level. This can lead to excessive charge up times while the battery recovers and in some cases, the battery may not be able to supply enough current in the charging cycle to reach the predetermined level.

In another example, such as described in U.S. Pat. No. 4,272,806 issued Jun. 9, 1981, a battery of a DC—DC Converter is coupled to a transformer to charge the capacitor for use in an electronic strobe flash unit. This circuit is designed to be an optimal compromise in battery performance and converter performance. The charging cycle is or terminated or switched when the voltage of the battery source decays to a predetermined level. The discharging cycle is terminated or switched when the current flowing into the secondary lowers to a predetermined level.

SUMMARY OF THE INVENTION

The invention provides current controlled switching power supplies, used for example, as energy storage device charging circuits, are that provide maximum energy transfer from the switching power supply to the intended load.

In one embodiment, the invention can be characterized as a switching power supply comprising a power transformer having a primary and a secondary, a switching element for coupling a voltage source to the primary, a current sensor that measures a primary current and a secondary current, a rectifier coupled to the secondary adapted to conduct current to a load coupled thereto, and a control circuit coupled to the current sensor and the switching element that controls the operation of the switching element in response to the primary current and the secondary current. When the primary current in the primary reaches a first threshold, the control circuit causes the switching element to disconnect the voltage source from the primary which stops flow of the primary current in the primary and which causes the secondary current to conduct to the load. And when the secondary current drops to a second threshold, the control circuit causes the switching element to reconnect the voltage source to the primary which terminates the secondary current flow in the secondary and which causes the primary current to flow in the primary.

In another embodiment, the invention can be characterized as a switching power supply comprising a power transformer having a primary and a secondary, a switching element for coupling a rectified AC voltage source to the primary, a current sensor that measures a primary current and a secondary current, a rectifier coupled to the secondary that conducts current to an energy storage capacitor to be charged by the power supply, and a control circuit coupled to the current sensor and the switching element that controls the operation of the switching element in response to the primary current reaching a first threshold and the secondary current dropping to a second threshold. The control circuit adjusts the first threshold based upon variations of the voltage of voltage source.

In a further embodiment, the invention may be characterized as a switching power supply comprising a power transformer having a primary and a secondary, a switching element for coupling a rectified AC voltage to the primary, a current sensor that measures a primary current and a secondary current, a rectifier coupled to the secondary that conducts current to a load when coupled thereto, and a control circuit coupled to the current sensor and the switching element that controls the operation of the switching element in response to the primary current and the secondary current.

In a further embodiment, the invention may be characterized as a method of supplying power comprising the steps of: connecting a voltage source to a primary of a transformer; flowing primary current from the voltage source into the primary; disconnecting the voltage source from the primary when the primary current reaches a first threshold; flowing, as a result of the disconnecting step, a secondary current from the secondary to a load; and reconnecting the voltage source to the primary when the secondary current discharges to a second threshold.

BRIEF DESCRIPTION OF THE DRAWINGS

The above and other aspects, features and advantages of the present invention will be more apparent from the following more particular description thereof, presented in conjunction with the following drawings.

Corresponding reference characters indicate corresponding components throughout the several views of the drawings.

DETAILED DESCRIPTION

The following description is not to be taken in a limiting sense, but is made merely for the purpose of describing the general principles of the preferred embodiments. The scope of the invention should be determined with reference to the claims.

Switching power supplies, used for example, as energy storage device charging circuits, are provided herein that provide maximum energy transfer from the switching power supply to the intended load to be coupled thereto. In one embodiment, the switching power supply is current controlled and is used to charge energy storage capacitors. In preferred embodiments, the switching power supply uses an AC input source to charge high value energy storage capacitors.

Figure 1:
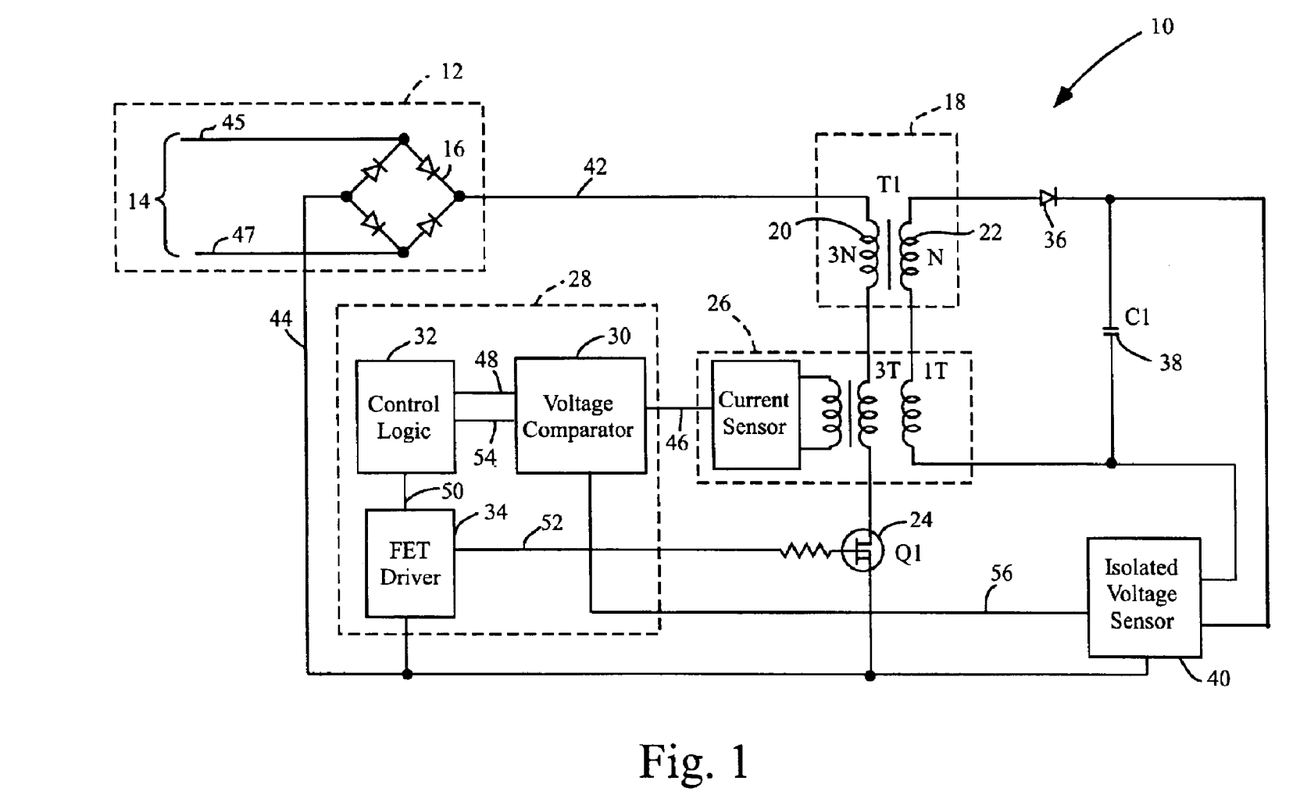
FIG. 1 is a block diagram of a switching power supply in accordance with one embodiment of the invention.

Referring first to FIG. 1, a block diagram is shown of a self-oscillating or switching power supply 10 (which may be referred to as a capacitor charging circuit when uses to charge energy storage capacitors) in accordance with one embodiment of the invention. Illustrated is a voltage source 12, which is embodied as an AC power source 14 and a full wave rectifier 16. Also illustrated is a transformer 18 including a primary winding 20 (also referred to as the primary 20) and a secondary winding 22 (referred to as the secondary 22). The primary 20 is coupled to the voltage source 12. A switching element 24 (e.g., a power switching element, such as a field effect transistor (FET)) is coupled in series with the primary 20 and the voltage source 12. A current sensor 26 is coupled to the primary 20 and the secondary 22. The current sensor 26 is coupled to a controller 28. In the illustrated embodiment, the controller 28 includes a voltage comparator 30 coupled to the output of the current sensor 26. The voltage comparator 30 is coupled to control logic 32, which is coupled to a driver 34. The driver 34 is coupled to and controls the switching element 24. On the secondary side of the transformer 18, an output rectifier 38 is connected in series to an energy storage capacitor 38 (generically referred to as a load) that is to be charged by the switching power supply 10. It is noted that although the capacitor 38 is illustrated as a single capacitor, it is understood that the capacitor 38 may comprise more than one capacitor, for example, coupled in series or parallel to each other (i.e., a capacitor bank). Additionally, an isolated voltage sensor 40 is coupled across the capacitor 38 and is also coupled back to the voltage comparator 30 of the controller 28.

In operation, the switching power supply 10 operates as a current controlled self-oscillating power supply for supplying a substantially constant current at its output. In preferred embodiments, the supply 10 is used for charging capacitors, preferably for charging high energy value capacitors. The voltage source 12 produces a voltage across lines 42 and 44. For example, the AC voltage source 14 is applied between lines 45 and 47 which are coupled to the full wave rectifier 16 which produces a full wave rectified voltage between lines 42 and 44. The switching element 24 controls the flow of current from the voltage source 12 into the primary 20 of the transformer 18. For example, when the switching element 24 is on, input current from the voltage source 12 is allowed to flow through the primary 20 and when the switching element 24 is off, the flow of input current into the primary is terminated. At the same time, any stored energy in the transformer due to the input current discharges from the secondary 22 in the form of a charging current flowing in the secondary 22 and through the capacitor 38. Then, once the switching element 24 is turned back on, the secondary current is terminated and the primary current is allowed to flow again. In operation, the switching element 24 oscillates between on and off states in order to transfer energy from the voltage source 12 to the load, e.g., the energy storage capacitor 38. Once the capacitor 38 is fully charged, the switching element 24 is turned off and ceases to oscillate.

The oscillation of the switching element 24 is controlled by the controller 28. Initially, the control logic 32 sends an appropriate signal to the driver 34 which sends a signal to the switching element 24. This allows the input current, e.g., an AC input current, to flow through the primary 20. With the switching element on, the current in the primary 20 increases. The current sensor 26 monitors the current in the primary 20 and outputs a voltage 46 that is proportional to the measured current. When the current in the primary reaches a preset limit or first threshold (i.e., the voltage 46 reaches a voltage cutoff level corresponding to the first threshold), the voltage comparator 30 provides an off signal 48 to the control circuit 32. In response, the control circuit 32 outputs a control signal 50 that causes the driver 34 to send a driver output 52 to turn the switching element 24 off.

The energy stored in the transformer 18 will now flow through the secondary circuit, i.e., current flows through the secondary 22, the output rectifier 36, the energy storage capacitor 38 and the secondary windings of the current sensor 26. Thus, a charging current is provided into the capacitor 38. The current sensor 26 measures also the secondary current. Actually, in known Hall devices, the current sensor 26 measures the summation of the current in the primary 20 and the secondary 22 at the same time; however, since there is not current flowing in the primary, the current measured is that of the secondary. When the current flowing in the secondary 22 as measured by the current sensor 26 drops to a preset limit or a second threshold, the switching element 24 turned back on. For example, when the voltage 46 output from the current sensor 26 drops to a second threshold voltage as determined by the voltage comparator 30, the voltage comparator outputs an on signal 54 to the control circuit 32. In response, the control circuit 32 outputs control signal 50 that causes the driver 34 to send a driver output 52 to turn the switching element 24 back on.

In use as a capacitor charging circuit, this cycle repeats until the voltage across the capacitor 38 builds up to a predetermined limit, i.e., the capacitor is fully charged. This is determined by the isolated voltage sensor 40, which continuously monitors the voltage across the capacitor 38. The voltage sensor 40 outputs a voltage signal 56 to the voltage comparator 30 of the controller 28. As noted above, since the voltage sensor 40 is coupled to the primary side of the transformer 18, the voltage sensor should be isolated from the secondary, in other words, a large impedance (e.g., several resistors in series) separates the voltage sensor from the secondary side of the transformer in order to avoid leakage current between the primary to the secondary. In one embodiment, the voltage sensor 40 comprises a high impedance differential amplifier. When the voltage signal 56 reaches the fully charged voltage level in the voltage comparator 30, the voltage comparator 30 does not output further control signals to the control logic. Thus, the voltage comparator 30 inhibits the control logic 32 and the driver 34 from turning the switching element 24 back on, since the capacitor is now fully charged.

In an alternative embodiment, as the voltage across the capacitor increases, the first threshold or the primary current cutoff voltage level is lowered. For example, as the capacitor voltage increases, the first threshold is correspondingly lowered until it equals the second threshold once fully charged.

Figure 2A:
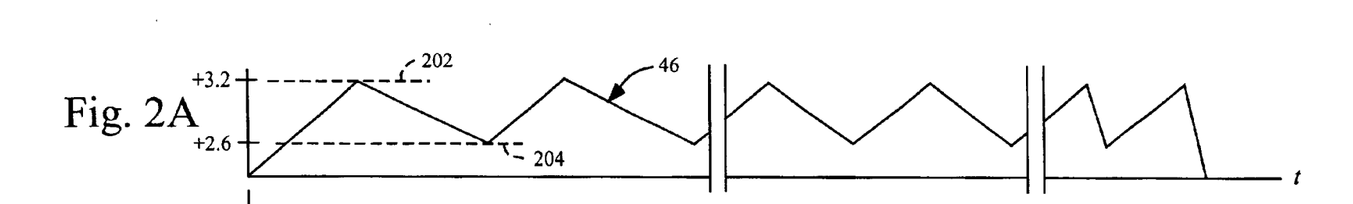
FIGS. 2A–2F are waveform illustrations at various points of time during the charging of a capacitor using the switching power supply of FIG. 1.
Figure 2B:
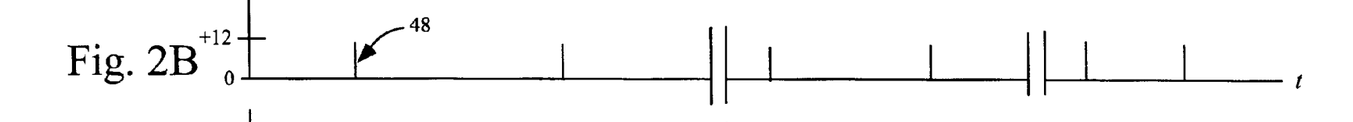
Figures 2C, 2D:
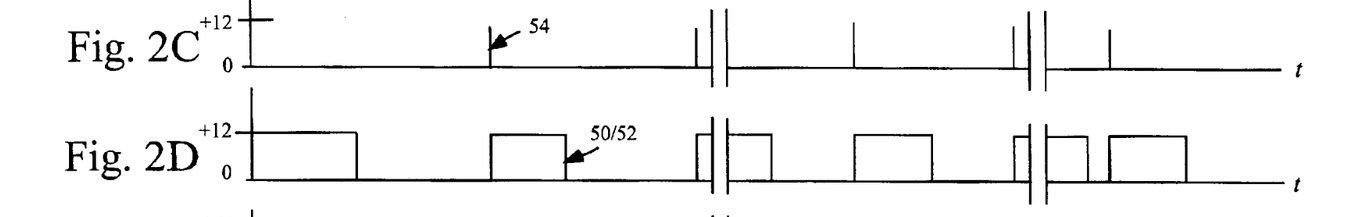
Figures 2E, 2F:
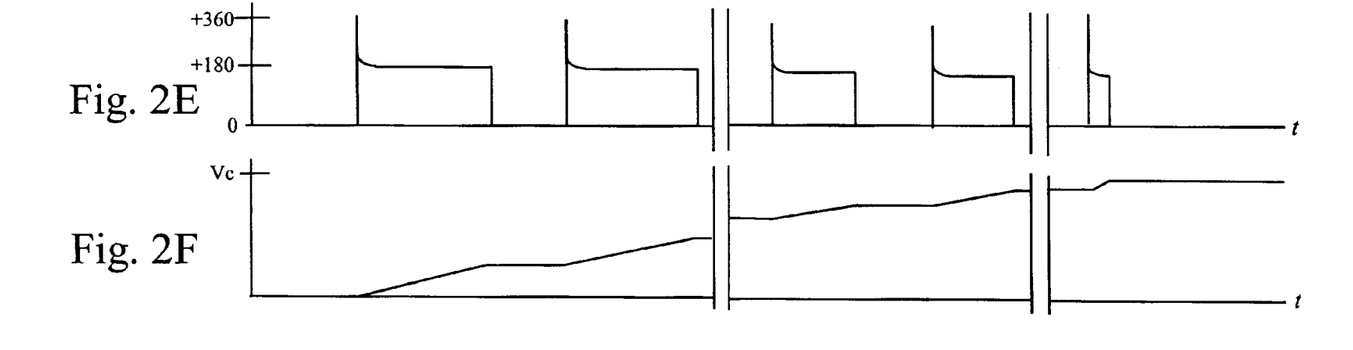

Next referring to FIGS. 2A–2F, waveform illustrations are shown at various points of time during the charging of a capacitor using the switching power supply 10 of FIG. 1 as a capacitor charging circuit. FIG. 2A is a waveform of the output 46 of the current sensor 26, the upward sloping portions representing the current building in the primary 20 and the downward sloping portions representing the current flowing in or discharging from the secondary 22. FIG. 2B illustrates the output signal 48 from the voltage comparator 30 that initiates turning off the switching element 24. FIG. 2C is the output signal 54 from the voltage comparator 30 that initiates turning on the switching element 24. FIG. 2D illustrates the control signal 50 and driver output 52. FIG. 2E illustrates the voltage across the switching element 24. FIG. 2F illustrates the voltage across the energy storage capacitor 38 as measured by the voltage sensor 40.

The waveforms of FIGS. 2A–2F are illustrated at different times during the charging process. For example, the waveforms are illustrated at (1) the beginning of charging where the capacitor is initially completely discharged and appears as a dead short; (2) a middle point where the capacitor is partially charged; and (3) the ending of the process where the capacitor is fully charged. The horizontal time axis of each of the waveforms is twice broken to illustrate the three different time periods.

As illustrated generally, the switching element 24 is initially switched on when the control signal 50 and the driver output 52 are set to a specified voltage, e.g., are set to +12 volts as seen in FIG. 2D. This allows the current to build in the primary 20 shown in the first upward slope of FIG. 2A. Once the current builds up to a predetermined primary current cutoff level or a first threshold 202 (e.g., once the voltage 46 reaches +3.2 volts determined by the voltage comparator 30), an off signal 48 (e.g., +12 volts) shown in FIG. 2B signals to the control circuit to cause the control signal 50 and the driver output 52 to go to a level (e.g., 0 volts) shown in FIG. 2D that will switch off the switching element 24. At this point, the current flow in the primary 20 is stopped and the output rectifier 36 conducts allowing current flow in the secondary 22 to begin indicated as the first downward sloping portion of FIG. 2A. It is noted that since in preferred form, the current sensor 26 measures current in both the primary and the secondary at the same time, the downward sloping portion represents only the current in the secondary 22, while the upward sloping portion represents only the current in the primary 20.

As illustrated, the current flowing in the secondary 22 decreases until it reaches a secondary current cutoff level or a second threshold 204 (e.g., once the voltage 46 reaches +2.6 volts determined by the voltage comparator 30), an on signal 54 (e.g., +12 volts) shown in FIG. 2C that signals to the control circuit to cause the control signal 50 and the driver output 52 to go back to a level (e.g., +12 volts) shown in FIG. 2D that will switch back on the switching element 24. As illustrated, this cycle is repeated in a self-oscillating manner until the capacitor 38 is fully charged. It is noted that the second threshold 204 may be different depending on the embodiment. For example, the second threshold may as low as 0 volts such that all of the energy stored in the transformer will be discharged as secondary current before switching the primary current back on again. However, setting the second threshold above 0 volts reduces ripple current throughout the system.

As seen in FIG. 2F, while the charging current is flowing in the secondary, and thus, into the capacitor, the capacitor 38 begins to charge up. Also illustrated in FIG. 2E, the voltage across the switching element 24 goes from 0 volts to a very brief peak of +360 volts and then settles to +160 volts while the current is flowing in the secondary. As the secondary current is terminated, the voltage across the switching element 24 returns to 0 volts.

During the period of initial charging, i.e., the left-most time period of the waveforms of FIGS. 2A–2F, the capacitor 38 is initially completely discharged and appears as a dead short. Thus, the time to discharge the energy stored in the transformer in the form of current flowing in the secondary takes a long period of time. That is, the first downward sloping portion in FIG. 2A slopes gradually to the second threshold 204. This is due to the fact that the capacitor 38 appears as a dead short when completely discharged, i.e., the voltage is initially zero across the capacitor as shown in FIG. 2F. This provides a large rush of current for an extended period of time in the secondary. Conventional power supplies for charging capacitors (capacitor charging circuits) provide a choke inductor or other current limit path in order not to damage the transformer or the charging circuit. Such current limit paths provide an additional path for the current to flow in order to discharge the secondary before transferring more energy thereto. These current limit paths are utilized initially until the capacitor voltage has charged up enough to rapidly discharge the secondary windings without the current limit path. If such current limit paths are not provided or if sufficient energy is not discharged from the transformer, conventional capacitor charging circuits may attempt to switch back to the primary before the secondary is sufficiently discharged. Such conventional capacitor charging circuits will then provide further current into the primary, i.e., energy into the transformer, until the transformer becomes saturated. Saturation may occur over several cycles as the energy in the transformer ratchets up with each cycle until it reaches saturation. Furthermore, even with a current limit path, conventional capacitor charging circuits are not equipped to handle this short circuit current rush for extended periods of time.

In contrast and according to several embodiments of the invention, a current limit path is not provided. Thus, when the secondary current initially flows in the secondary 22, maximum current flow is input into a dead short until the energy stored in the transformer discharges to a point where the current in the secondary drops to the second threshold 204. Thus, the discharge cycle (secondary current flow) is allowed to be significantly longer than the charge cycle (primary current flow) when the capacitor is initially charged. Preferably, the secondary current cutoff level or second threshold 204 is near 0 volts or at least is below a point which will allow the energy stored in the transformer to ratchet up to the point of saturation during subsequent charge and discharge cycles. This is also additionally controlled by controlling the amount of energy stored in the transformer during the charging cycle (i.e., primary current flow), by switching off the switching element when the primary current reaches a predetermined primary current cutoff level or first threshold 202. Preferably, the first cutoff is set such that the energy stored in the transformer during a given charging cycle when discharged into the secondary 22 does not provide enough secondary current to fully charge the capacitor 38.

As can be seen during the successive time periods, the time for the secondary current to discharge down to the second threshold 204 decreases as the capacitor voltage builds. For example, during the second time period, the charging cycle and the discharging cycle are approximately equal while during the third time period, the discharging cycle is significantly shorter than the charging period. In one embodiment, a given discharge cycle during the first time period may last several milliseconds compared to several microseconds during the third time period, e.g., from 0.2 msec to 7.0 μsec. Additionally, as seen the charging cycle takes approximately the same amount of time throughout the entire process.

Therefore, the frequency of the oscillations of the switching element 24 varies dramatically across the time period of charging the capacitor 38. According to several embodiments of the invention, by switching the secondary 22 on and off based on the secondary current, the frequency is allowed to vary, which increases the efficiency of the energy transfer.

In contrast, the frequency of many conventional switching power supplies is fixed while the capacitor is charged. That is, the time duration from the beginning of the charging cycle of the transformer to the end of the discharging cycle of the transformer remains the same at all points in the charging of the capacitor. By allowing the frequency to change, e.g., a lower initial frequency, the transformer 18 will discharge to an acceptable level without requiring a current limit path during the initial dead short appearance of the capacitor. For example, the ratio of the switching frequency at or near the fully charged time period to the switching frequency during the initial charging period preferably ranges from 10:1 to 20:1. In one embodiment, the ratio of the switching frequency at or near the fully charged period to that during the initial charging period is about 14:1, e.g., the switching frequency varies from approximately 5 kHz to about 70 kHz from the initial charging period to a fully charged period. In another embodiment having the 14:1 ratio, the switching frequency varies from about 500 Hz to about 7 kHz. Thus, the ratio of between 10:1 and 20:1 provides a dynamic range in the switching frequency from the dead short period to the fully charged period.

In preferred embodiments, the switching power supply 10 is used as a capacitor charging circuit to charge one or more high energy values capacitors, for example, having capacitances of 100s to 1000s of farads. In other words, the capacitors have at least 1000 watt-min of energy storage. For example, in one embodiment, the circuit 10 charges 20 capacitors in series, each having a capacitance of 2500 farads. The charging process of such capacitors lasts several minutes, e.g., 15–20 minutes to charge up to a 500–600 watt level. It is understood that the principals of the invention may be applied to capacitors are various energy storage levels.

In the illustrated embodiment, the voltage source comprises an AC source, such as taken from a 60 Hz AC power line (120 Hz modulated DC current) that has a voltage swing of between 90–260 volts. However, in other embodiments, the voltage source comprises a DC source, such as provided by a battery supply or by filtering a rectified AC source. For example, capacitive filtering may be used to further filter the illustrated rectified AC voltage source such that it appears as a DC voltage source. However, with high energy storage capacitors, it is preferred that the voltage source be an AC source, such as an AC power line, rather than a DC battery source, which will decay over time and require replacement or recharging. Furthermore, with the AC source, there is little concern in the circuit design for optimization of the energy transfer or performance of the power source, since it is not a DC source. Additionally, in preferred embodiments, the switching power supply 10 handles the wide AC input voltage swings associated with worldwide power and large output voltage swings associated with charging energy storage capacitors.

The switching element 24 may be any suitable power switching element, such as a bipolar junction transistor (BJT), field effect transistor (FET), insulated-gated bipolar transistor (IGBT) or other transistor. The switching element 24 may also be an electromechanical switch if the frequency of the oscillating switching supply is low enough.

Additionally, the current sensor 26 is illustrated as a Hall current sensing device, which is well known in the art. For example, the Hall current sensing device includes primary and second windings and simultaneously measures the current in both the primary and the secondary of the transformer. Advantageously, Hall current sensing devices can handle from DC to high frequencies. Preferably, the windings of the current sensing device have the same turns ratio as the transformer 18 in order that the measured voltage representing the current in the primary and the secondary is proportional to the actual current in the primary and the secondary. In preferred embodiments, the transformer 18 has a N:1 turns ratio, where preferably N=3. Thus, the Hall current sensing device also has a 3:1 turns ratio. Thus, as you charge the primary, it develops an output voltage proportional to ⅓ of the primary current and when the secondary is switched, the output is proportional to the secondary current.

However, it is understood that other types of current sensing devices may be used. For example, separate current sensing devices may be used measure the current in the primary and the current in the secondary, each current sensing device coupled to the controller 28. In this alternative embodiment, the current sensing device in the secondary would have to be an isolated device with a very high impedance relative to the secondary such that it does not violate leakage current between the primary and the secondary. Thus, as used herein, the term current sensor that measures the current of the primary and the secondary is understood to be a single current sensing device (such as a Hall device) or a current sensing circuit coupled to the primary and a current sensing circuit coupled to the secondary.

The control of the charging and discharging cycles according to several embodiments of the switching power supply 10 of FIG. 1 provides for the most possible energy transfer into the capacitor 38 since the switching of the primary 20 and the secondary 22 is based upon the current in the primary and the secondary, and since maximum current output is coupled to the capacitor at the initial charging stage. In preferred embodiments, once the current in the secondary discharges to the second threshold 204, the circuit immediately switches to allow current to flow in the primary. Thus, the switching power supply 10 provides a relatively constant current supply to the load, e.g., the capacitor 38. Advantageously, the switching power supply 10 switches entirely based upon the current in the primary and in the secondary. Thus, the switching or control of current flow in the secondary is independent of the voltage in the secondary until the capacitor reaches its fully charged level, then the charging circuit is disabled.

Figure 3:
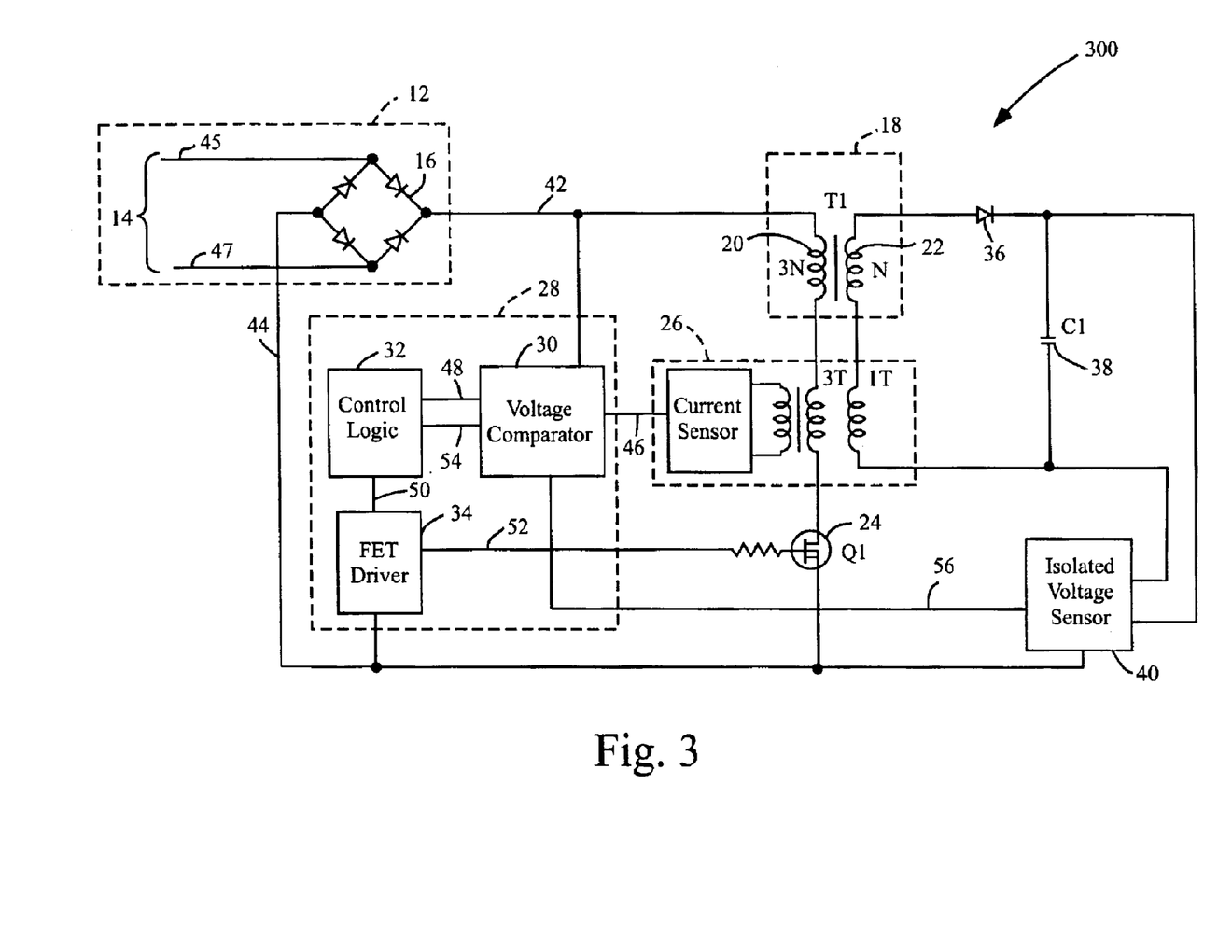
FIG. 3 is a block diagram of a variation the switching power supply of FIG. 1 in accordance with the invention.

Referring next to FIG. 3, a block diagram is shown of a variation of the switching power supply of FIG. 1 using an AC voltage source at its input in accordance with the invention. Many of the components of the switching power supply 300 are the same as in FIG. 1; thus, their description is not repeated. In this embodiment, the first threshold described above is modulated or adjusted based upon the changing voltage of the rectified AC input voltage. Thus, as illustrated, the input voltage is coupled to the voltage comparator 30, which adjusts the first threshold proportional to the input voltage.

Figure 4:
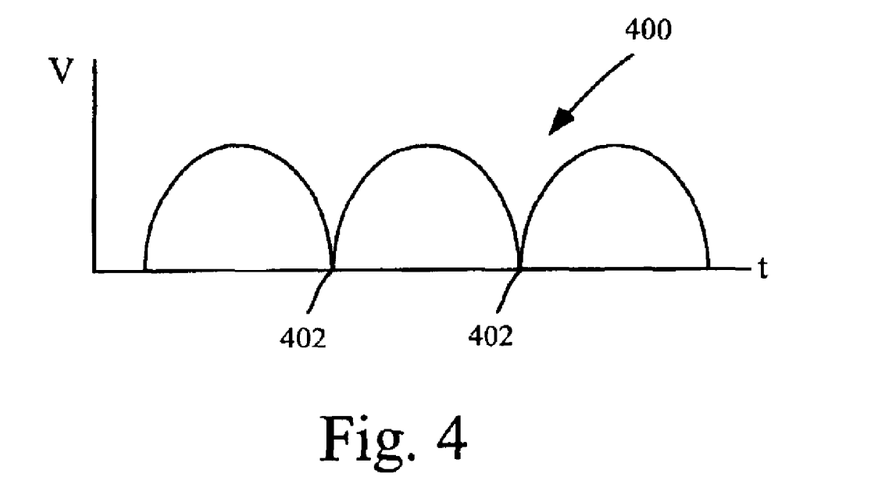
FIG. 4 is a waveform illustrating a rectified AC voltage input which is coupled to the primary of the switching power supply of FIG. 3.

For example, FIG. 4 illustrates a full wave rectified voltage 400 which is produced across lines 42 and 44. As is easily seen, the voltage varies at different points in time. In some embodiments, if the current flows through the primary 20 during the zero crossings 402 of the rectified AC voltage signal 400, large current surges produce unwanted harmonics (e.g., $3^{rd}$, $5^{th}$, $7^{th}$, etc. harmonics) that may exceed acceptable levels. The levels of such harmonics are typically highest at and near the zero crossing points 402.

Figure 5:
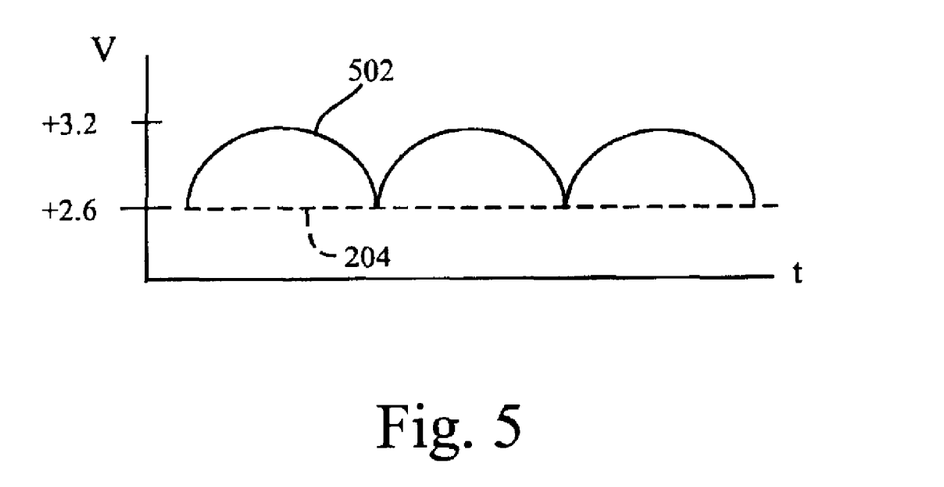
FIG. 5 is a waveform of the primary current cutoff level modulated to be proportional to the rectified AC voltage input of FIG. 4 and as used in the switching power supply of FIG. 3.

Referring to FIG. 5, a waveform is shown of the primary current level or first threshold 502 modulated according to the rectified AC voltage signal 400 of FIG. 4 and as used in the switching power supply 300 of FIG. 3. Accordingly, in one embodiment, the primary current cutoff level or first threshold 502 is adjusted or modulated with changes in the voltage of the rectified AC signal 400. That is, as the signal 400 nears a zero crossing 402, the first threshold 502 is correspondingly lowered; thus reducing the amount of current drawn in the primary 20. As described above, when the current in the primary 20 (as measured by the current sensor 26 and input to the voltage comparator 30 as voltage 46) reaches the first threshold 502, the off signal 48 is generated and sent to the control logic 32 to switch the switching element 24. However, in this embodiment, the first threshold 502 is variable depending on the voltage of the rectified AC signal. In preferred embodiments, the first threshold 502 is modulated such that at the zero crossings 402, there is no current flow in the primary 20. That is, at the zero-crossings 402, the first threshold 502 is equal to the secondary current cutoff voltage level or the second threshold 204.

Specifically, as with the embodiment of FIGS. 2A–2F, the first threshold 502 has a peak level is +3.2 volts for example, while the first threshold 502 has a low value of the +2.6 volts at the zero-crossings 402. Thus, the first threshold 502 is at its peak during the peak of the rectified AC signal 400. Therefore, the value of the first threshold 502 is proportional to the rectified AC input voltage. Advantageously, this provides for power factor correction and input harmonic cancellation. It is noted that although the first threshold 502 is adjusted based upon the changing voltage of the input source, the charging cycle (i.e., when the switching element 24 is turned on to flow current through the primary 20) is still switched based upon the current sensed in the primary 20. However, the threshold to switch off the charging cycle changes with time and is proportional to the rectified AC voltage.

Figure 6:
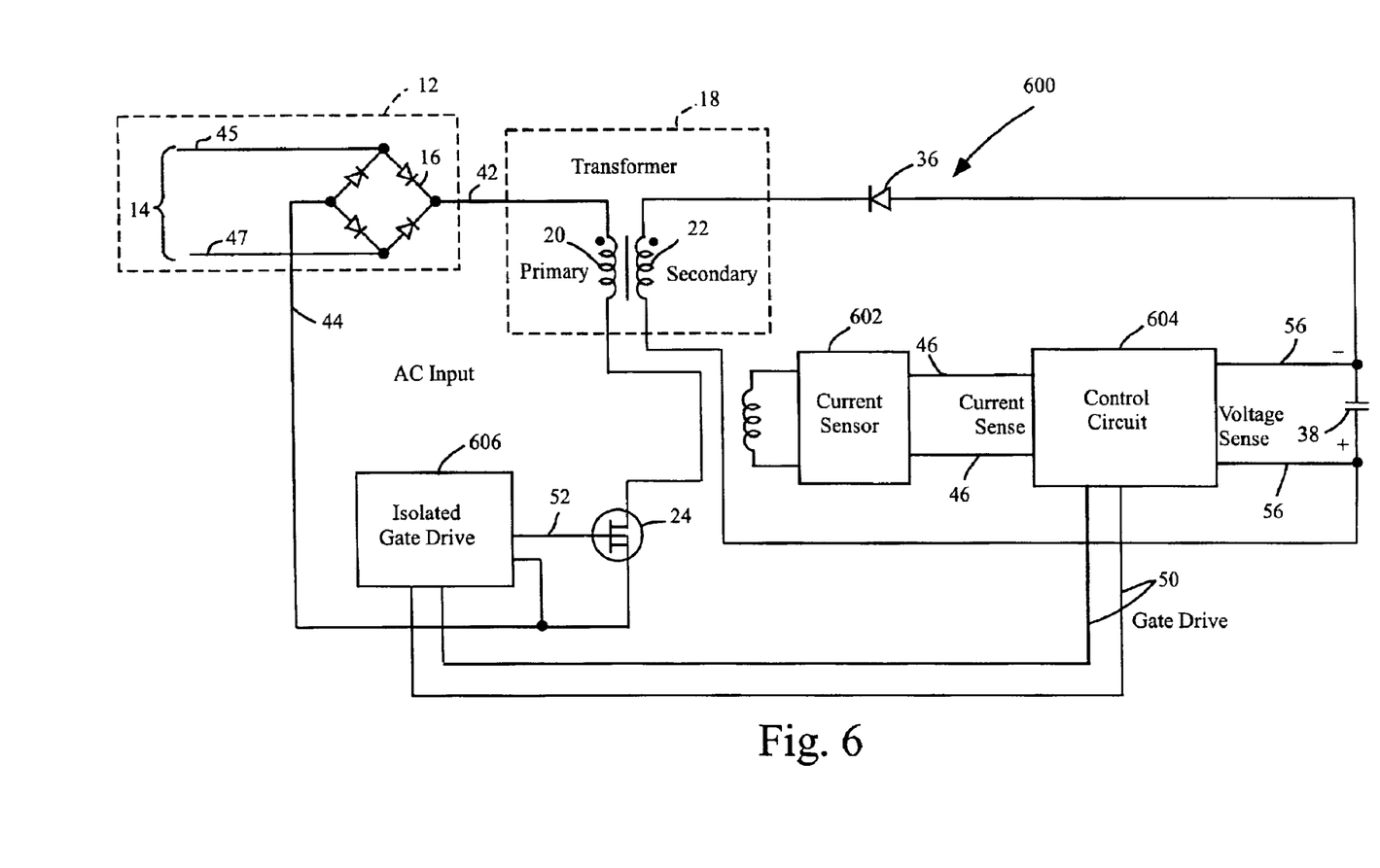
FIG. 6 is a block diagram of a switching power supply in accordance with another embodiment of the invention.

Referring next to FIG. 6, a block diagram is shown of a switching power supply in accordance with another embodiment of the invention. Many of the components of the switching power supply 300 are the same as in FIG. 1; thus, their description is not repeated. Many of the components of the switching power supply 600 are the same as in FIG. 1; thus, their description is not repeated. In this embodiment, the current sensor 602 and the control circuit 604 are coupled to the secondary side of the transformer 18, rather than the primary side. In this embodiment, the transformer 18 has a 1:1 turns ratio. Preferably, the current sensor 602 is a Hall device that senses the current in both the primary 20 and the secondary 22 at the same time. As described above, the current sensor 602 outputs voltage 46 that is proportional to the current flowing in the primary 20 and the secondary 22. Like the voltage comparator 30 and the control logic 32 of FIGS. 1 and 3, the control circuit 604 compares the current in the primary to the first threshold 202. Once the current increases to the first threshold 202, the control circuit 604 sends the control signal 50 to an isolated driver 606 on the primary side of the transformer 18. The isolated driver 606 is coupled to the switching element 24. The driver output 52 goes to a level to cause the switching element 24 to switch off. Then, the current flows in the secondary through the output rectifier 36 and the capacitor 38. Once the current in the secondary drops to the second threshold 204 as measured by the current sensor 602 and determined by the control circuit 604, the control circuit 204 outputs the control signal 50 to the isolated driver 606 that causes the driver output 52 to cause the switching element 24 to turn back on. The control circuit 604 also inputs the voltage across the capacitor 38 to control when the capacitor charging circuit 600 is disabled.

In this embodiment, since the control circuit 604 is on the secondary, the isolated driver 606 is at a high impedance relative to the control logic to isolate the switching element 24 from leakage current from the secondary.

Again, as the embodiments described above, the oscillations of the switching power supply 600 are controlled based upon the current in the primary and the current in the secondary. This provides maximum energy transfer, including during the period of initial charging where the capacitor 38 appears as a dead short. Again, the switching is independent of the voltage of the secondary, until the capacitor is fully charged.

While the invention herein disclosed has been described by means of specific embodiments and applications thereof, numerous modifications and variations could be made thereto by those skilled in the art without departing from the scope of the invention set forth in the claims.

What is claimed is:

1. A switching power supply comprising:
   a power transformer having a primary and a secondary; a switching element for coupling a voltage source to the primary;
   a current sensor that measures a primary current and a secondary current;
   a rectifier coupled to the secondary adapted to conduct current to a load coupled thereto; and
   a control circuit coupled to the current sensor and the switching element that controls the operation of the switching element in response to the primary current and the secondary current;
   wherein when the primary current in the primary reaches a first threshold, the control circuit causes the switching element to disconnect the voltage source from the primary which stops flow of the primary current in the primary and which causes the secondary current to conduct to the load; and
   wherein when the secondary current drops to a second threshold, the control circuit causes the switching element to reconnect the voltage source to the primary which terminates the secondary current flow in the secondary and which causes the primary current to flow in the primary.

2. The supply of claim 1 wherein the voltage source comprises a DC voltage source.

3. The supply of claim 1 wherein the voltage source comprises a rectified AC voltage source.

4. The supply of claim 3 wherein the rectified AC voltage source comprises a full wave rectifier coupled to an AC power line.

5. The supply of claim 1 wherein the switching element comprises a power field effect transistor.

6. The supply of claim 1 wherein the current sensor is coupled to the primary.

7. The supply of claim 1 wherein the current sensor comprises a Hall effect sensor for measuring the primary current and the secondary current.

8. The supply of claim 7 wherein the Hall effect sensor has a turns ratio equal to a turns ratio of the power transformer.

9. The supply of claim 1 wherein the secondary current supplied to the load comprises a substantially constant current.

10. The supply of claim 1 wherein the load comprises an energy storage capacitor, the supply further comprising:
    an isolated voltage sensor coupled to the energy storage capacitor for measuring the voltage across the energy storage capacitor, the voltage coupled to the control circuit.

11. The supply of claim 10, when the voltage reaches a fully charged level, the control circuit preventing the switching element from switching back on when the secondary current reaches the second threshold in order to stop the charging process.

12. The supply of claim 10 wherein the control circuit adjusts the first threshold as the voltage of the energy storage capacitor increases.

13. The supply of claim 10 wherein a full amount of the secondary current directly conducts into the energy storage capacitor when energy storage capacitor is in an initially discharged state.

14. The supply of claim 10 wherein a time duration of each successive cycle of the current flow in the secondary decreases as the energy storage capacitor charges.

15. The supply of claim 10 wherein a ratio of the frequency of the switching element switching between connected and disconnected states with the voltage source when the energy storage capacitor is charged to the frequency during initial charge ranges between about 10:1 and about 20:1.

16. The supply of claim 10 wherein the energy storage capacitor comprises a high energy storage capacitor having a capacitance of at least 100 farads.

17. The supply of claim 1 wherein the control circuit adjusts the first threshold based upon variations in a voltage level of the voltage source.

18. The supply of claim 1 wherein when the secondary current drops to the second threshold, the control circuit immediately causes the switching element to reconnect the voltage source to the primary.

19. A switching power supply comprising:
    a power transformer having a primary and a secondary; a switching element for coupling a rectified AC voltage source to the primary;
    a current sensor that measures a primary current and a secondary current;
    a rectifier coupled to the secondary that conducts current to an energy storage capacitor to be charged by the power supply; and
    a control circuit coupled to the current sensor and the switching element that controls the operation of the switching element in response to the primary current reaching a first threshold and the secondary current dropping to a second threshold; and
    wherein the control circuit adjusts the first threshold based upon variations of the voltage of voltage source.

20. The supply of claim 19 wherein the rectified AC voltage source comprises a full wave rectifier coupled to an AC power line.

21. The supply of claim 19 wherein the control circuit modulates the first threshold corresponding to varying voltage levels of the rectified AC voltage source.

22. The supply of claim 19 wherein the control circuit sets the first threshold at a minimum value at zero voltage crossings of the rectified AC voltage source.

23. A switching power supply comprising:
    a power transformer having a primary and a secondary;
    a switching element for coupling a rectified AC voltage to the primary;
    a current sensor that measures a primary current and a secondary current; a rectifier coupled to the secondary that conducts current to a load when coupled thereto; and
    a control circuit coupled to the current sensor and the switching element that controls the operation of the switching element in response to the primary current and the secondary current.

* * * * *